L. E. McQUAY & W. K. NORRIS.
PACKING RING;
APPLICATION FILED JUNE 25, 1909.

948,518.  Patented Feb. 8, 1910.

Witnesses
J. Richard Riggles
G. M. Copenhaver

Inventors
Louis E. McQuay
and William K. Norris
By Chas. D. Swett
Attorney

UNITED STATES PATENT OFFICE.

LOUIS E. McQUAY AND WILLIAM K. NORRIS, OF EAST ST. LOUIS, ILLINOIS.

PACKING-RING.

948,518.  Specification of Letters Patent. Patented Feb. 8, 1910.

Application filed June 25, 1909. Serial No. 504,322.

*To all whom it may concern:*

Be it known that we, LOUIS E. MCQUAY and WILLIAM K. NORRIS, citizens of the United States, residing at East St. Louis, in the county of St. Clair and State of Illinois, have invented certain new and useful Improvements in Packing-Rings, of which the following is a specification.

This packing ring is to be used on piston heads in steam, gas, gasolene, air and other engines using piston head packing; also in air - compressors, vacuum, hydraulic and other pumps, using piston head packing.

The objects of the invention are to facilitate the insertion of packing rings in the piston head, and to avoid loss of power by leakage, or blowing.

The accompanying drawing illustrates the invention, in which—

Figure 1:
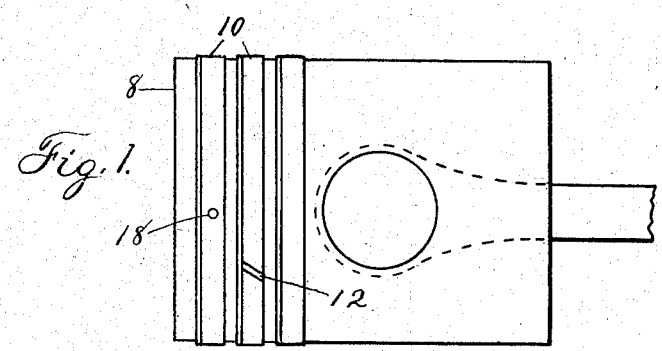
Figure 2:
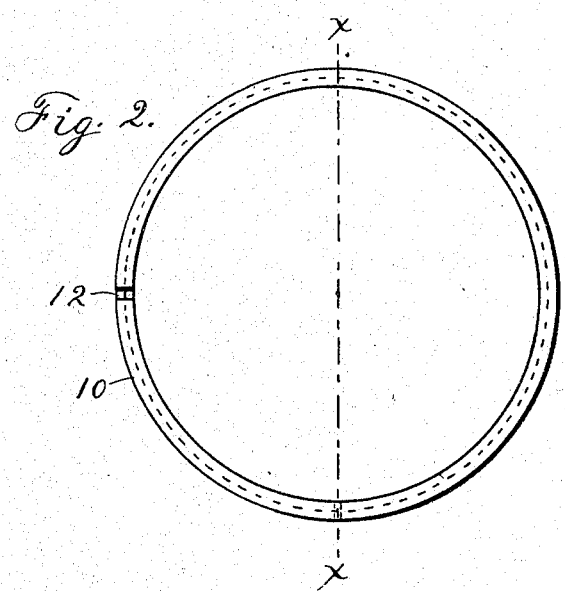
Figure 3:
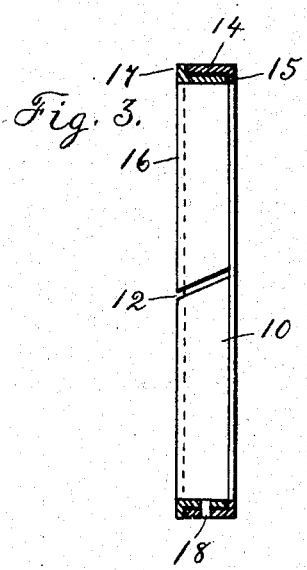

Figure 1, shows, in outline, a gas-engine piston-head, carrying three of our packing rings. Fig. 2 is an enlarged face view of one of our rings slightly opened; and Fig. 3 is a section, taken on line *x—x* of Fig. 2.

The numeral character 8, designates the piston-head of a gas-engine, provided with three grooves, in which are three of our packing-rings 10, 10, which appear in profile. These rings 10 are made in two members, each member having an opening 12. The rings are expansible and resilient, and are seated in the grooves by spreading them sufficiently to be slipped over the end of the piston-head and moved along to the grooves into which they spring when released. Their expanding quality keeps their outer surfaces in sliding contact with the walls of the cylinder.

As shown in the drawing, the outer member of the ring is composed of a band 14, having the inwardly turned flange 15 on its edge; and the inner member of the ring is composed of a band 16, having an outwardly turned flange 17, on its edge. The width of the flange on the band of each member exactly equals the thickness of the band of the other member, so that the two members fit together to form a single ring, having plane interior and exterior surfaces.

The openings 12, of each member are placed opposite a solid part of the other member, and the members are detachably held together in that relative position, by a pin 18.

With this construction the members move freely upon each other when the ring is expanded or contracted.

What we claim and desire to secure, is—

1. A packing ring comprising two open bands, one within the other, the outer band having an inwardly turned flange and the inner band having an outwardly turned flange, each of said flanges bearing against the unflanged edge of the other band.

2. An expansible, resilient, packing ring comprising two open members of equal width and one within the other, each member having an annular flange overlapping the unflanged edge of the other member, the opening in each said member being opposite to a solid part of the other member and a pin to detachably hold said members in proper relative position.

In testimony whereof we affix our signatures, in presence of two witnesses.

LOUIS E. McQUAY.
WILLIAM K. NORRIS.

Witnesses:
GROVER C. BORDERS,
E. N. CUSHMAN.